(12) United States Patent
Kashchenevsky

(10) Patent No.: US 6,375,542 B1
(45) Date of Patent: Apr. 23, 2002

(54) HYDROSTATIC SPINDLE UNIT WITH AUTOMATIC SELF CENTERING OF THE WORKPIECE

(75) Inventor: Leonid Kashchenevsky, Stratford, CT (US)

(73) Assignee: Moore Tool Company Incorporated, Bridgeport, CT (US)

( * ) Notice: Subject to any disclaimer, the term of this patent is extended or adjusted under 35 U.S.C. 154(b) by 72 days.

(21) Appl. No.: 09/638,942

(22) Filed: Aug. 15, 2000

(30) Foreign Application Priority Data

Aug. 23, 1999 (IL) .................................................. 131525

(51) Int. Cl.[7] .............................................. B24B 5/00
(52) U.S. Cl. ............................. 451/24; 451/5; 451/402; 384/100; 384/107
(58) Field of Search ............................. 451/5, 8, 9, 10, 451/24, 402; 384/100, 107

(56) References Cited

U.S. PATENT DOCUMENTS 3,855,734 A * 12/1974 Fournier ...................... 451/24
4,324,073 A * 4/1982 Belthle ...................... 51/281 R
4,919,547 A * 4/1990 Schwartzman .............. 384/110
5,833,522 A * 11/1998 Niino et al. ................. 451/294
6,036,585 A * 3/2000 Nishi et al. ................. 451/259

* cited by examiner

Primary Examiner—Joseph J. Hail, III
Assistant Examiner—Anthony Ojini
(74) Attorney, Agent, or Firm—Bachman & LaPointe, P.C.

(57) ABSTRACT

The present invention relates to an improved spindle unit. The spindle unit includes a body, an external shaft placed into the body and rotating on bearings relative to the body, and an internal shaft placed into the external shaft and coupled thereto. The spindle unit further includes front and rear static journal bearings and a thrust bearing between the external and internal shafts. Flow control valves are provided which have their outlets connected to recesses communicating with the rear and front journal bearings. Operation of the valves in response to measured parameters controls the position of the internal shaft relative to the rotation axis of the external shaft. This is accomplished by controlling the flow of fluid to recesses associated with the front and rear journal bearings. By controlling the position of the internal shaft, one can insure that a workpiece attached to the internal shaft is automatically centered.

11 Claims, 4 Drawing Sheets

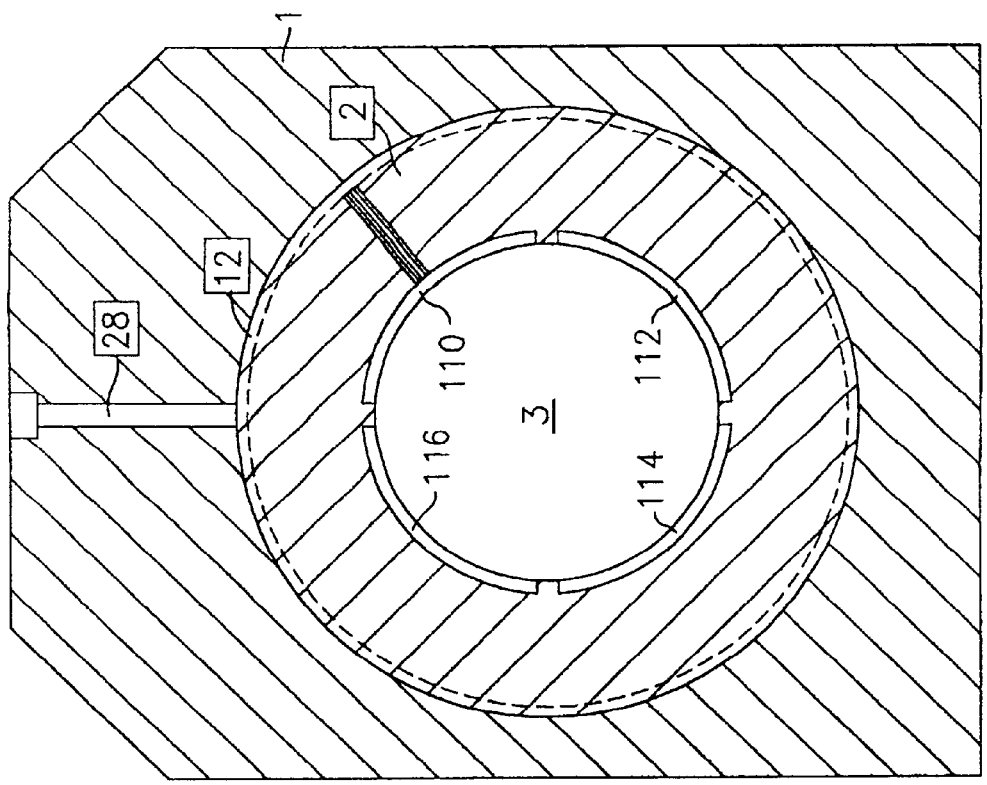
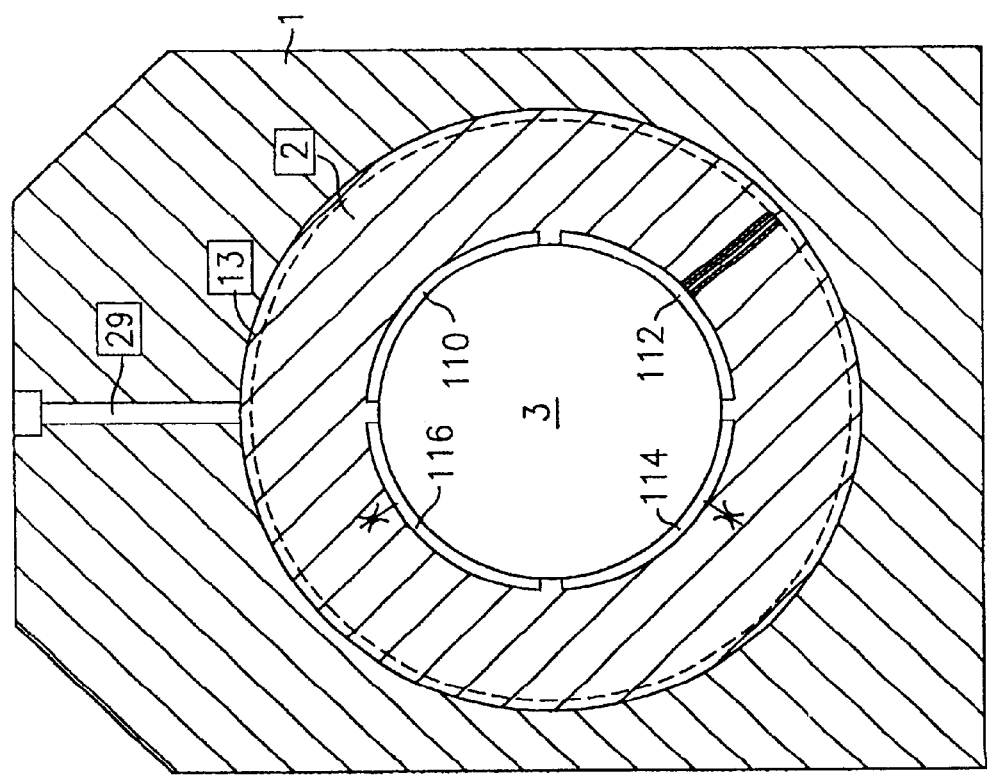

HYDROSTATIC SPINDLE UNIT WITH AUTOMATIC SELF CENTERING OF THE WORKPIECE

BACKGROUND OF THE INVENTION

The present invention relates to the machine tool industry and mainly to the manufacture of precision machine tools. More particularly, the present invention relates to an improved spindle unit.

One of the often faced problems in precision machining and in precision measuring processes is high accuracy alignment of a workpiece relative to a spindle's rotational axis. To achieve on an internal grinding machine, a high level of concentricity between the internal hole and the just ground external surface requires the precision alignment of the workpiece to make the run out of external surface as small as possible. If the workpiece alignment has to be done in two different cross sections, tilting motion must be avoided as well. To obtain the constant diameter of the cutting tool and the desired high level of concentricity between the cutting teeth and the shank of the tool on the tool grinding machine, the blank has to be aligned accurately relative to the rotational axis to avoid both run out and tilting motions. If the required tolerances are within 0.01 mm., the problem can be solved, for example, by usage of a precision collet chuck. The accuracy and repeatability of most precision chucks are within 0.003–0.005 mm. If the required tolerances are of the same range as the chuck's accuracy or even smaller, the only way is manual adjustment that usually, has to be repeated several times, because manual adjustments take a long time. Obviously, such an approach can not be used for serial production.

SUMMARY OF THE INVENTION

Accordingly, it is an object of the present invention to provide a spindle unit that provides a fast and fully automatic way to achieve high precision alignment and to eliminate run out simultaneously in two different cross sections of the workpiece.

The foregoing object is met by the spindle unit of the present invention.

In accordance with the present invention, a spindle unit comprises a body, an external shaft placed within the body and supported for rotation about an axis by one or more bearings and an internal shaft placed into the external shaft and coupled thereto by means of a flexible coupling. The spindle unit further has front and rear journal bearings and a thrust bearing for supporting the internal shaft within the external shaft. Flow control valves with outlets are connected to recesses in communication with the front and rear journal bearings. The flow control valves are used to control the position of the internal shaft relative to the rotation axis by controlling the flow of fluid to the journal recesses. By controlling the position of the internal shaft, the workpiece attached to the internal shaft is automatically self centered.

Other details of the spindle unit of the present invention, as well as other advantages and objects attendant thereto, are set forth in the following detailed description and the accompanying drawings wherein like reference numerals depict like elements.

BRIEF DESCRIPTION OF THE DRAWINGS

FIGS. 3A and 3B are sectional views taken along lines 3A—3A and 3B—3B respectively in FIG. 1.

DETAILED DESCRIPTION OF THE PREFERRED EMBODIMENT(S)

Figure 1:
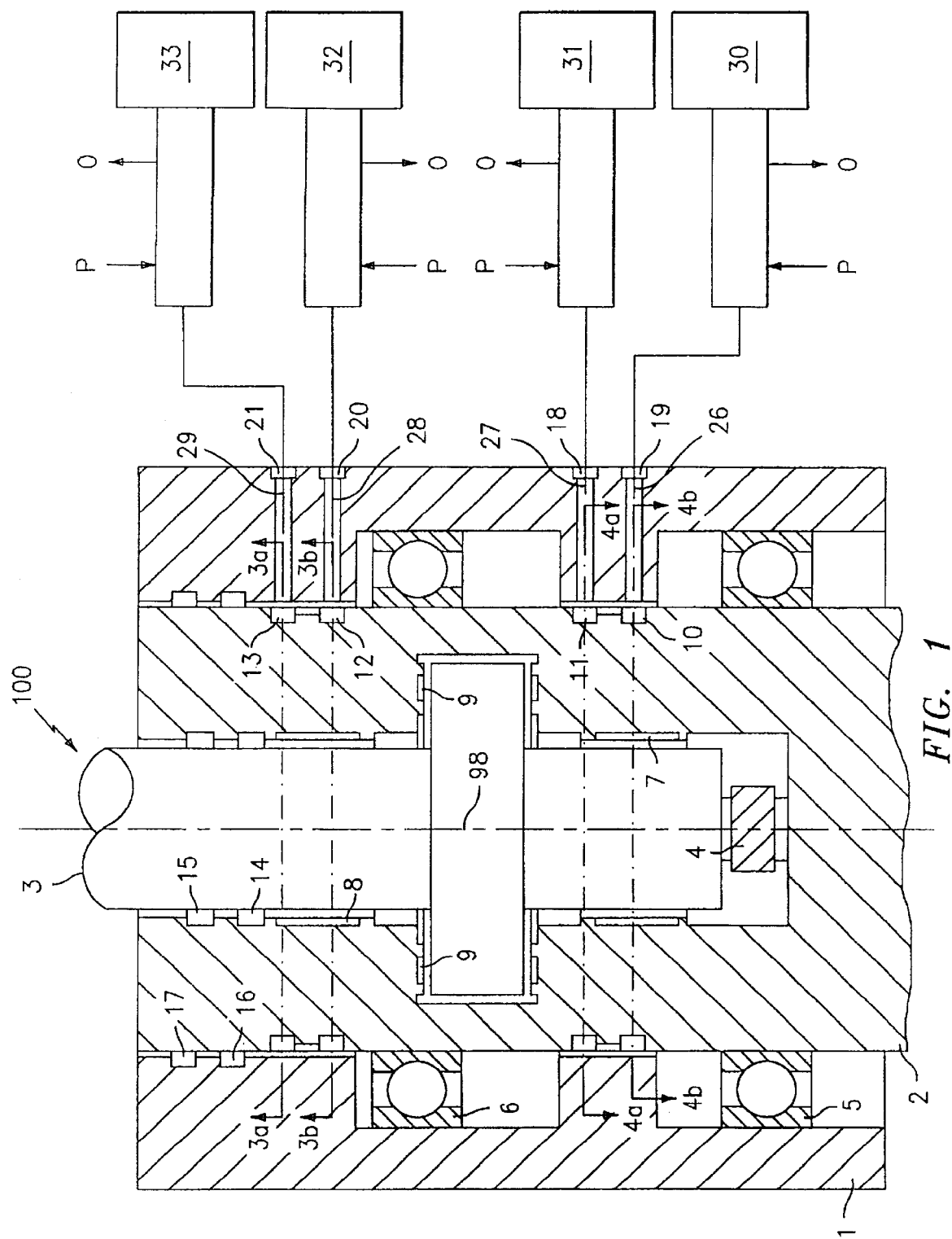
FIG. 1 is a cross sectional view of a spindle implemented in the unit in accordance with the present invention.

Referring now to FIG. 1, a spindle unit 100 in accordance with the present invention includes a shaft 2, referred to as an external shaft, placed into a body or housing 1. The external shaft 2 is rotatable relative to the body 1 on its bearings 5 and 6, which bearings are preferably precision bearings. As can be seen from FIG. 1, the external shaft rotates about an axis 98. A shaft 3, referred to as an internal shaft, is placed inside the external shaft 2 and is supported by means of front journal bearing 8, rear journal bearing 7, and thrust bearing 9. The front and rear journal bearings may comprise any suitable hydro- or air-static bearings known in the art. Similarly, the thrust bearing 9 may comprise any suitable thrust bearing known in the art, such as a hydrostatic thrust bearing, for fixing the internal shaft 3 in position.

Internal shaft 3 does not rotate relative to the external shaft 2. Rather, it is connected to the shaft 2 by means of a flexible coupling 4. The flexible coupling 4 may comprise any suitable flexible coupling known in the art.

Figure 4B:
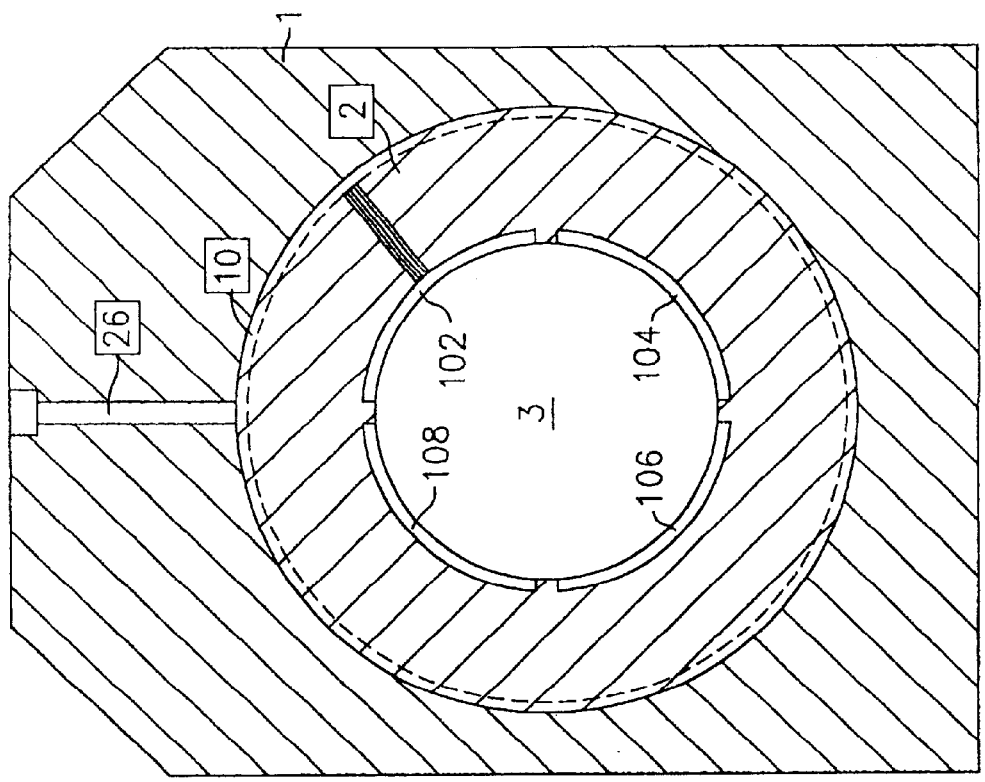
FIGS. 4A and 4B are sectional views taken along lines 4A—4A and 4B—4B respectively in FIG. 1.
Figure 4A:
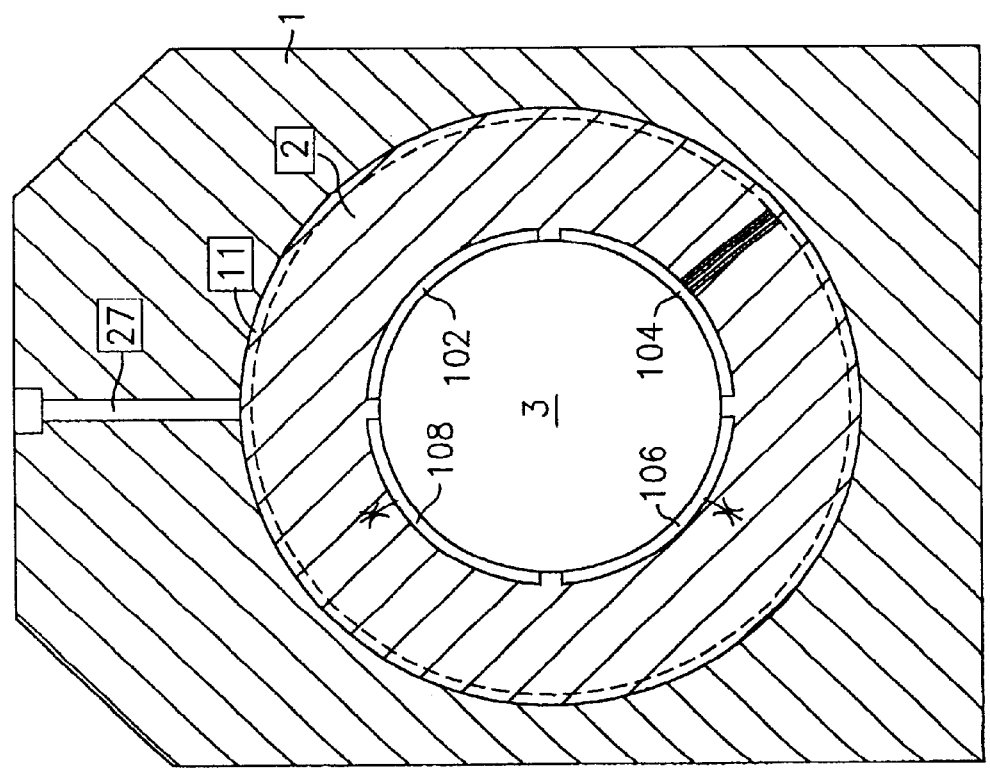

Each of the journal bearings 7 and 8 has two cylindrical or annular grooves in fluid communication with it. As shown in FIGS. 1, 4A and 4B, the grooves 10 and 11 are connected to the rear journal bearing 7 and, as shown in FIGS. 1, 3A and 3B, the grooves 12 and 13 are connected to the front journal bearing 8. Referring now to FIGS. 4A and 4B, the grooves 10 and 11 are respectively connected to recesses or passageways 102 and 104 machined in the external shaft 2. As shown in this figure, the recesses or passageways 102 and 104 are separated by an angle of about 90 degrees. Also machined into the external shaft are recesses or passageways 106 and 108, each of which is connected to a fluid source through an inlet restrictor.

Referring now to FIGS. 3A and 3B, the grooves 12 and 13 are respectively connected to recesses or passageways 110 and 112 machined into the external shaft 2. As shown in these figures, the recesses or passageways 110 and 112 are separated by an angle of about 90 degrees. Also machined into the external shaft 2 are recesses or passageways 114 and 116. These passageways are connected to a fluid source through an inlet restrictor.

As shown in FIG. 1, each of the grooves 10, 11, 12, and 13 is connected to one of the flow control valves 30, 31, 32, and 33. To this end, each of the cylindrical grooves 10–13 is connected by one of channels 26, 27, 28, and 29 to the ports 18, 19, 20, and 21 located on an external surface of the body 1. As can be seen from FIG. 1, a fluid line connects each of the ports 18, 19, 20, and 21 to the outlet of one of the flow control valves 30, 31, 32, and 33. This means that the outlet of a respective one of the valves 30, 31, 32, and 33 is connected to a respective one of the recesses 102, 104, 110, and 112. For example, the outlets of valves 30 and 31 are connected to the recesses 102 and 104 of rear journal bearing 7 with the angle between these recesses being about 90 degrees and the outlets of valves 32 and 33 are connected to the recesses 110 and 112 of front journal bearing 8 with the angles between these recesses also being about 90 degrees.

The flow control valves 30, 31, 32 and 33 are preferably constructed so that when the valve's shaft (not shown) is in a central position, the hydraulic resistance of the valve is equal to the hydraulic resistance of the constant inlet restrictors and/or the two other recesses associated therewith. Therefore, initially, the internal shaft 3 will be in a central position relative to the external shaft 2 both in the areas of the rear and front journal bearings 7 and 8. When the valve's shaft is in a first one of its end positions, the valve connects the respective recess to a tank (not shown), thus the pressure is 0 and when the shaft is in a second one of its end positions, it connects the respective recess directly to fluid at a supply pressure P. Therefore, when a respective valve shaft is moving from one end position to the other, the internal shaft 3 will move in a respective direction in the area of a respective one of the bearings 7 and 8 from one extreme position to another. It should be recognized of course that the extreme positions are restricted by the internal wall of the shaft 2. By moving all four shafts of the valves 30, 31, 32, and 33 simultaneously, it is possible to control the position of the internal shaft 3 relative to external shaft 2 and therefore, relative to the rotation axis 98.

Cylindrical groove 14 in the external shaft and cylindrical groove 16 in the body 1 function as return grooves for returning operating fluid to a tank (not shown). Annular seals 15 and 17 are provided to insure that there is no leakage of the operating fluid.

Figure 2:
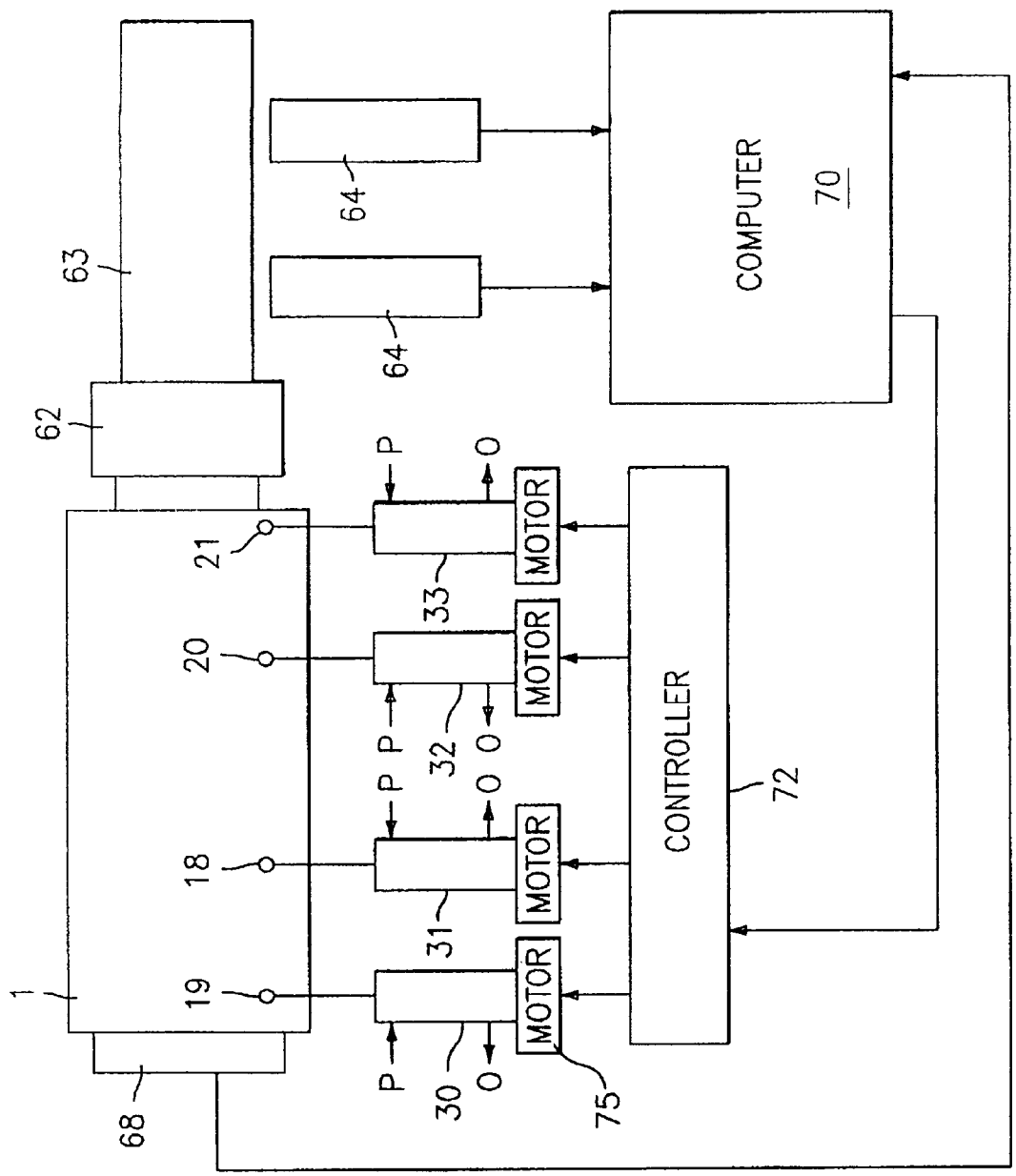
FIG. 2 is an enlarged view of the spindle unit of the present invention including its control elements.

Referring now to FIG. 2, a chuck 62 is connected to a flange (not shown) of the internal shaft 3. Further, the workpiece 63 is clamped in the chuck 62. Displacement transducers 64 and an angle encoder 68 are connected to a computer 70. The displacement transducers 64 measure the displacement of the workpiece 63 from its centered position. The angle encoder 68 is a transducer which measures the absolute angle of the shaft. Measurements resulting from displacement transducers 64 together with measurements resulting from the angle encoder 68 enable the building of polar graphs for two different error motions in two cross sections where displacement transducers 64 are located.

The computer 70 may comprise any suitable computer known in the art which has been programmed using any suitable programming language known in the art to accomplish the aim of the present invention. As shown in FIG. 2, the computer 70 receives measurement signals from the displacement transducers 64 and the angle encoder 68. Based on these measurement signals, the computer 70 transmits a control signal to a four channel controller 72 that controls four servo motors 75. The shafts of the valves 30, 31, 32, and 33 are moved by servo motors 75 connected to the controller 72. Thus, in response to the measurement signals, the valves 30, 31, 32, and 33 are operated to change the flow of a control fluid, either hydraulic fluid or air, to the recesses 102, 104, 110, and 112. As a result, the position of the internal shaft 3 will be changed to make the run out zero in two cross sections. In this way, the workpiece 63 attached to the internal shaft 3 is automatically maintained in a centered position.

It should be appreciated that the present invention is not limited by the above-described embodiments and that changes and modifications can be made by one ordinarily skilled in the art without deviation from the scope of the invention as will be defined below in the appended claims.

It should also be appreciated that features disclosed in the foregoing description and/or in the following claims, and/or in the accompanying drawings, and/or examples, and/or tables may, both separately and in any combination thereof, be material for realizing the present invention in diverse forms thereof.

What is claimed is:

1. A spindle unit for achieving high precision alignment and to eliminate run out simultaneously in two different cross sections of a workpiece comprising a body, an external shaft mounted within said body for rotation about an axis, an internal shaft placed within said external shaft and coupled thereto, two journal bearings between said external shaft and said internal shaft, and means for supplying fluid to said journal bearings to control the position of said internal shaft relative to said rotation axis.

2. A spindle unit according to claim 1, wherein said internal shaft is coupled to said external shaft by a flexible coupling.

3. A spindle unit according to claim 1, further comprising a thrust bearing for supporting said internal shaft within said external shaft.

4. A spindle unit according to claim 1, wherein said fluid supply means comprises first and second recesses in communication with a first one of said journal bearings and first and second flow control valves connected to said first and second recesses.

5. A spindle unit according to claim 4, wherein said first recess is substantially perpendicular to said second recess.

6. A spindle unit according to claim 4, wherein said fluid supply means comprises third and fourth recesses in communication with a second one of said journal bearings and third and fourth flow control valves connected to said third and fourth recesses.

7. A spindle unit according to claim 6, wherein said third recess is substantially perpendicular to said fourth recess.

8. A spindle unit according to claim 6, wherein said fluid supply means comprises detecting means for measuring the position of a workpiece joined to said internal shaft and an angle encoder, a computer for receiving measurement signals from said detecting means and said angle encoder, and a controller connected to said computer, said controller controlling said first, second, third and fourth flow control valves.

9. A spindle unit according to claim 8, wherein said controller causes each of said valves to move between a first position wherein a fluid under pressure is supplied to a respective recess and a second position wherein no pressure is applied to a respective recess.

10. A spindle unit according to claim 1, wherein each journal bearing comprises a hydrostatic journal bearing.

11. A spindle unit according to claim 1, wherein each journal bearing comprises an air-static journal bearing.

* * * * *